(12) United States Patent
Tatsumi

(10) Patent No.: US 9,762,850 B2
(45) Date of Patent: Sep. 12, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Eisaku Tatsumi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/415,021

(22) Filed: Jan. 25, 2017

(65) Prior Publication Data
US 2017/0214884 A1    Jul. 27, 2017

(30) Foreign Application Priority Data
Jan. 27, 2016  (JP) ................. 2016-013832

(51) Int. Cl.
| | |
|---|---|
| H04N 7/01 | (2006.01) |
| H04N 9/78 | (2006.01) |
| H04N 9/64 | (2006.01) |
| G06T 7/13 | (2017.01) |
| G06T 3/40 | (2006.01) |
| H04N 11/24 | (2006.01) |

(52) U.S. Cl.
CPC ......... *H04N 7/0117* (2013.01); *G06T 3/4053* (2013.01); *G06T 7/13* (2017.01); *H04N 9/646* (2013.01); *H04N 9/78* (2013.01); *G06T 3/4092* (2013.01); *G06T 2207/20192* (2013.01); *H04N 11/006* (2013.01)

(58) Field of Classification Search
USPC .......... 348/441–459; 375/240; 382/263, 275
See application file for complete search history.

(56) References Cited

U.S. PATENT DOCUMENTS

| | | | | |
|---|---|---|---|---|
| 4,003,052 A | * | 1/1977 | Adelman | ............... G01S 13/52 342/159 |
| 4,831,463 A | * | 5/1989 | Faroudja | .............. H04N 7/0803 348/665 |
| 5,043,805 A | * | 8/1991 | Citta | ...................... H04N 7/015 348/473 |

(Continued)

FOREIGN PATENT DOCUMENTS

JP     2010-263598 A     11/2010

*Primary Examiner* — Paulos M Natnael
(74) *Attorney, Agent, or Firm* — Carter, DeLuca, Farrell & & Schmidt, LLP

(57) ABSTRACT

An apparatus comprises an unit to receive an input of an input image signal including a high resolution component signal and a low resolution component signal; an unit to obtain a high frequency component signal of the high resolution component signal and obtain a low resolution signal obtained by scaling down the resolution of the high resolution component signal; an unit to change a value of at least one of the low resolution signal and the low resolution component signal based on a combination of a value of the low resolution signal and a value of the low resolution component signal; and an unit to generate an output image signal corresponding to the input image signal based on the at least one of the low resolution signal and the low resolution component signal whose value has been changed, and the high frequency component signal.

14 Claims, 12 Drawing Sheets

(56) References Cited

U.S. PATENT DOCUMENTS

| | | | | | |
|---|---|---|---|---|---|
| 5,892,879 | A | * | 4/1999 | Oshima | H03M 13/256 348/726 |
| 6,587,505 | B1 | * | 7/2003 | Nozawa | H04N 9/7921 375/240 |
| 6,597,739 | B1 | * | 7/2003 | Li | H04N 19/63 375/240.19 |
| RE42,589 | E | * | 8/2011 | Tinker | H04N 19/63 375/240 |
| 8,031,169 | B2 | * | 10/2011 | Hoerl | H04N 5/208 345/10 |
| 2003/0030580 | A1 | * | 2/2003 | Stice | H03M 1/129 341/200 |
| 2010/0098152 | A1 | * | 4/2010 | Glenn | H04N 7/0135 375/240.01 |
| 2011/0026593 | A1 | * | 2/2011 | New | H03M 7/42 375/240.12 |
| 2011/0157482 | A1 | * | 6/2011 | Adachi | G06T 5/009 348/739 |
| 2014/0037226 | A1 | * | 2/2014 | Murahashi | G06T 5/002 382/263 |
| 2015/0187055 | A1 | * | 7/2015 | Murahashi | H04N 5/142 382/264 |
| 2016/0005148 | A1 | * | 1/2016 | Mine | H04N 5/21 382/269 |
| 2016/0282707 | A1 | | 9/2016 | Tatsumi | |

* cited by examiner

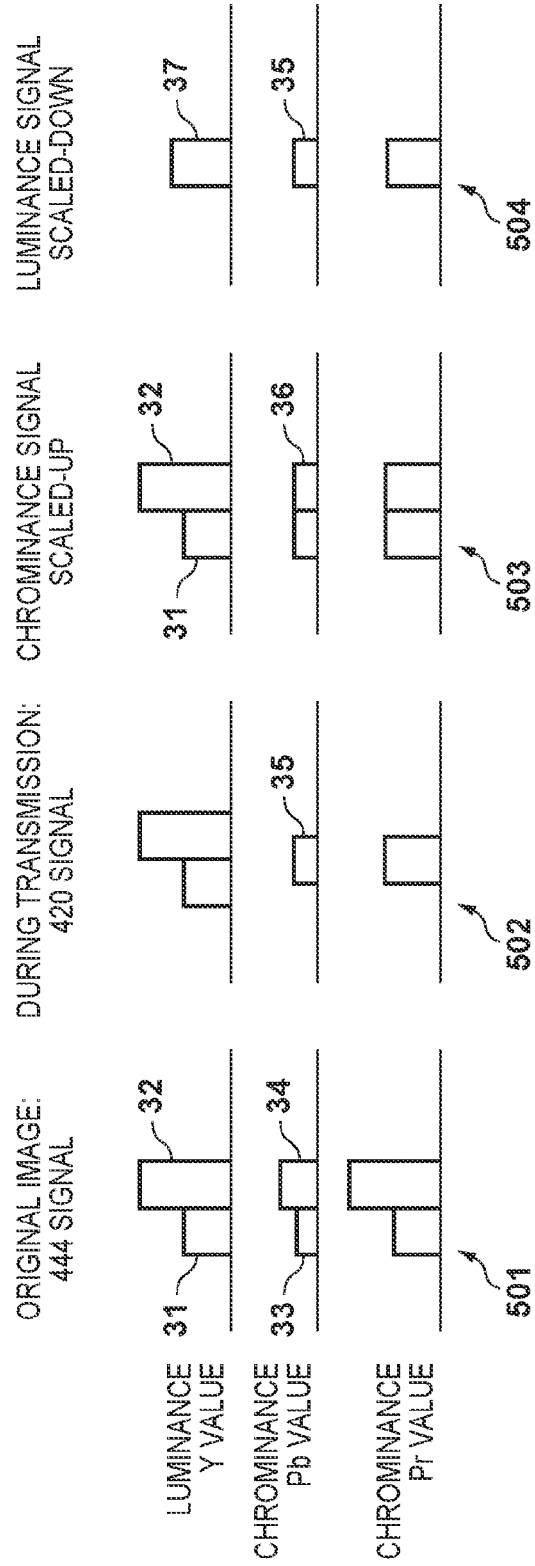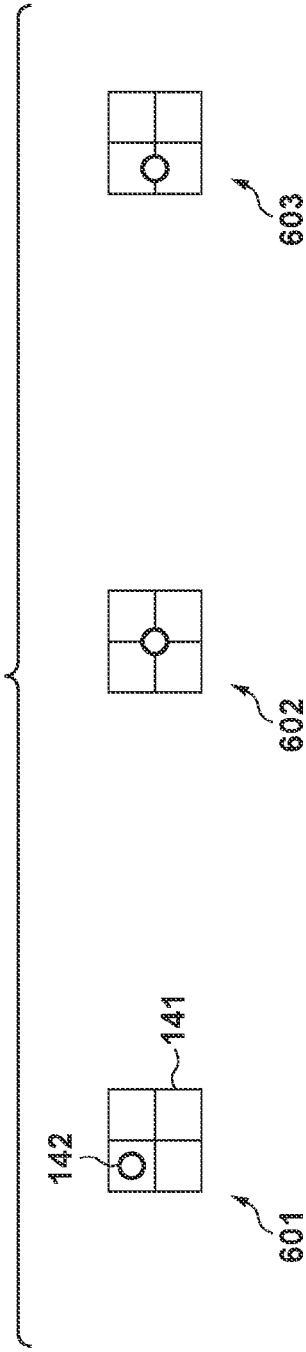

FIG. 7

701 — AVERAGE FILTER 3×3

| 1 | 1 | 1 |
|---|---|---|
| 1 | 1 | 1 |
| 1 | 1 | 1 |

TOTAL/9 OR TOTAL * 7/64

702 — AVERAGE FILTER 4×4

| 1 | 1 | 1 | 1 |
|---|---|---|---|
| 1 | 1 | 1 | 1 |
| 1 | 1 | 1 | 1 |
| 1 | 1 | 1 | 1 |

TOTAL/16

703 — GAUSSIAN FILTER 4×4

| 1 | 2 | 2 | 1 |
|---|---|---|---|
| 2 | 3 | 3 | 2 |
| 2 | 3 | 3 | 2 |
| 1 | 2 | 2 | 1 |

TOTAL/32

704 — GAUSSIAN FILTER 5×5

| 1 | 1 | 1 | 1 | 1 |
|---|---|---|---|---|
| 1 | 1 | 2 | 1 | 1 |
| 1 | 2 | 4 | 2 | 1 |
| 1 | 1 | 2 | 1 | 1 |
| 1 | 1 | 1 | 1 | 1 |

TOTAL/32

705 — AVERAGE FILTER 3×2

| 1 | 1 | 1 |
|---|---|---|
| 1 | 1 | 1 |

TOTAL/6

706 — GAUSSIAN FILTER 3×2

| 1 | 2 | 1 |
|---|---|---|
| 1 | 2 | 1 |

TOTAL/8

707 — GAUSSIAN FILTER 5×4

| 1 | 1 | 2 | 1 | 1 |
|---|---|---|---|---|
| 1 | 2 | 4 | 2 | 1 |
| 1 | 2 | 4 | 2 | 1 |
| 1 | 1 | 2 | 1 | 1 |

TOTAL/32

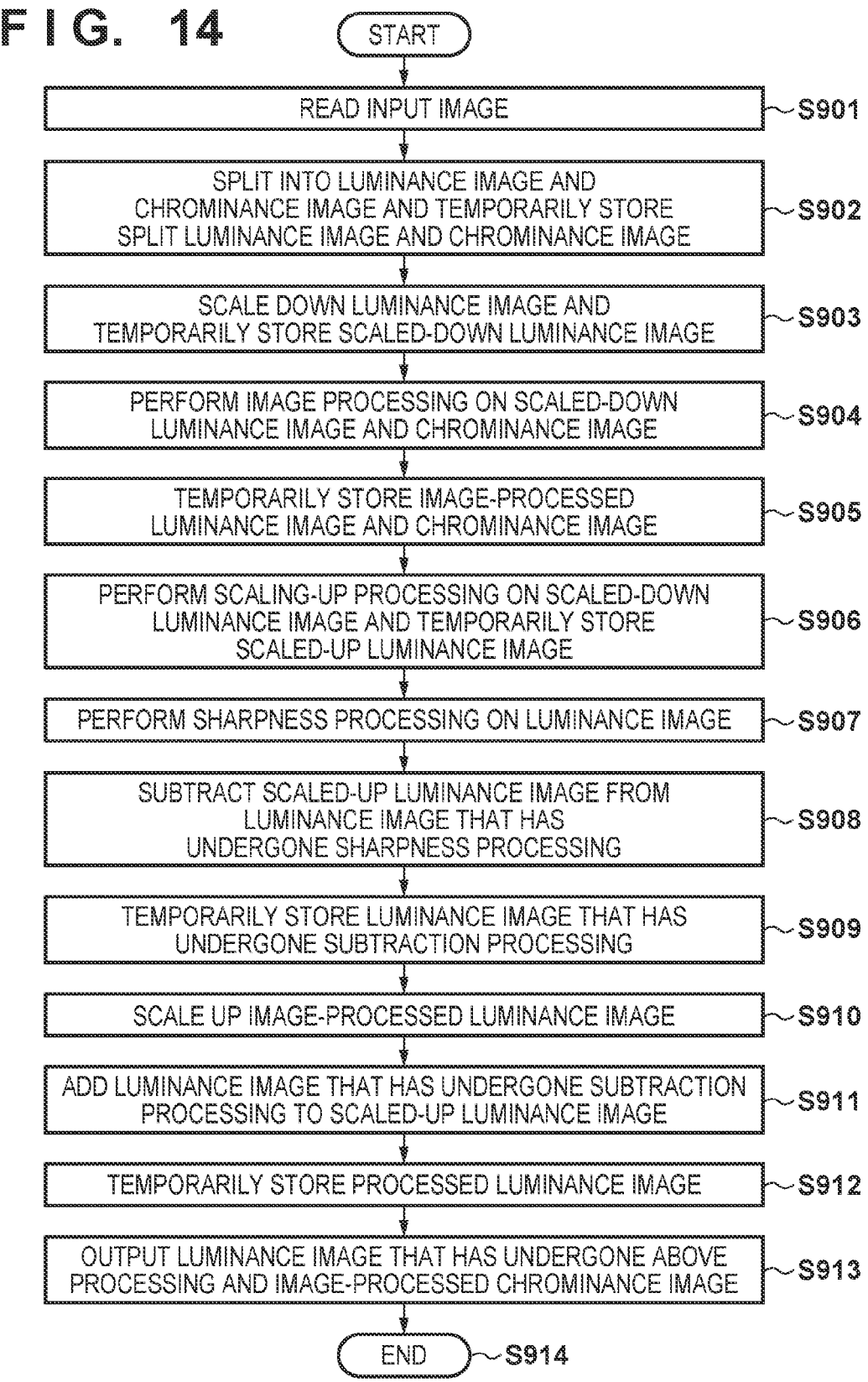

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

According to conventional technology, a luminance signal and a chroma signal included in a video signal are transmitted as having different resolutions. In a standard definition (SD) video and a high definition (HD) video that use interlaced scanning, a signal format called "422 format" is often used to transmit the signals. The 422 format is a format in which two pixels' worth of a red chrominance signal and two pixels' worth of a blue chrominance signal are stored with respect to four pixels' worth of a luminance signal, and in this format, the chrominance signals have a resolution half that of the luminance signal. This is to save the signal bandwidth required for transmission and recording by utilizing the fact that the vision characteristics of human eyes are more sensitive to luminance changes, and relatively insensitive to color changes.

In recent years, ultra-high definition (UHD) videos with 4 k resolution and super-high vision (SHV) videos with 8 k resolution are beginning to be distributed through broadcasting and media. These signal formats use sequential (progressive) scanning, and a format called "420 format" is dominantly used. The 420 format is a format in which there are only one pixel's worth of a red chrominance signal and one pixel's worth of a blue chrominance signal with respect to four pixels' worth of a luminance signal, the four pixels including two pixels in the vertical direction and two pixels in the horizontal direction. In this case, the chrominance signals have a resolution half that of the luminance signal in the vertical and horizontal directions, which is equal to one quarter resolution in total.

The 420 format as described above is effective to save the bandwidth required for transmission and recording. However, many image processing operations simultaneously use the luminance signal and the chrominance signals. Examples of such image processing operations include color correction processing and tone correction processing that use a 3D look-up table, and the like.

In order to perform such image processing operations, it is necessary to adjust the resolution to match between the luminance signal and the chrominance signals. In order to adjust the resolution, usually, a method is used in which the resolutions of the chrominance signals are increased by pixel interpolation so as to match the resolution of the luminance signal. Alternatively, a method may be used in which image processing is performed by scaling down the luminance signal so as to match the resolution of the chrominance signals, and thereafter super-resolution processing is performed. Once image processing is performed by scaling down the luminance signal as described above, even when super-resolution processing is performed, the resolution information is not accurately restored, resulting in degradation of images.

Japanese Patent Laid-Open No. 2010-263598 discloses a method in which separate processing operations are performed on the luminance signal and the chrominance signals that have been processed to have a matching resolution. In the configuration disclosed in Japanese Patent Laid-Open No. 2010-263598, sharpness processing is performed on the luminance signal, separately from gain processing performed on RGB signals.

However, the conventional configuration has the following problems.

In order to perform image processing, such as color correction processing and tone correction processing, that use a 3D look-up table, it is necessary to adjust the resolution to match between the luminance signal and the chrominance signals. If processing is performed by increasing the resolution of the chrominance signals through pixel interpolation, the operating frequency bandwidth (processing load) of circuits required for the image processing increases.

In the configuration of Japanese Patent Laid-Open No. 2010-263598, the luminance signal and the RGB signals are processed separately, but the RGB signals have the same resolution as that of the luminance signal, and thus the required operating bandwidth also increases.

The problem that it is necessary to increase the operating bandwidth for image processing to be higher than the frequency bandwidth of the input signal arises when a hard circuit for image processing is used, and in image processing that uses a computer, the problem appears as an increased processing time.

Also, the problem arises not only in a signal in the 420 format, and is common in signals in the 422 format and the 411 format in which the luminance signal and the chrominance signals have different resolutions.

In order to solve the problem, the present invention provides a technique for performing image processing on an input signal composed of a plurality of image component signals having different resolutions so as to not compromise resolution information by using a less bandwidth.

SUMMARY OF THE INVENTION

According to one aspect of the present invention, there is provided an image processing apparatus comprising: an input unit configured to receive an input of an input image signal including a high resolution component signal and a low resolution component signal having a lower resolution than a resolution of the high resolution component signal; a first obtaining unit configured to obtain a high frequency component signal of the high resolution component signal included in the input image signal; a second obtaining unit configured to obtain a low resolution signal obtained by scaling down the resolution of the high resolution component signal included in the input image signal; a changing unit configured to change a value of at least one of the low resolution signal and the low resolution component signal based on a combination of a value of the low resolution signal obtained by the second obtaining unit and a value of the low resolution component signal included in the input image signal input by the input unit; and a generation unit configured to generate an output image signal corresponding to the input image signal based on the at least one of the low resolution signal and the low resolution component signal whose value has been changed by the changing unit, and the high frequency component signal obtained by the first obtaining unit.

Further features of the present invention will become apparent from the following description of exemplary embodiments with reference to the attached drawings.

BRIEF DESCRIPTION OF THE DRAWINGS

FIG. 5 is a diagram illustrating a relationship between color shifting and image processing.

FIG. 6 is an illustrative diagram regarding the position of the center of gravity of a luminance signal and a chrominance signal in the 420 format.

FIG. 7 is a diagram showing an example of a low pass filter (LPF).

FIG. 14 is a flowchart showing processing performed by the microprocessor.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An image processing apparatus according to a first embodiment of the present invention will be described with reference to FIGS. 1 to 7.

Image Processing Apparatus

Figure 1:
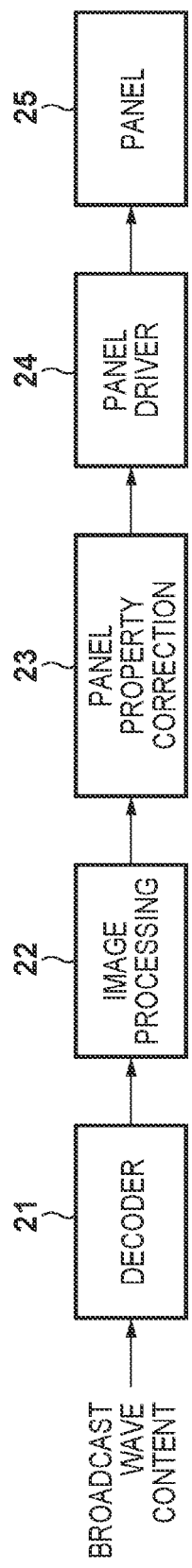
FIG. 1 is a block diagram showing an overall configuration of an image processing apparatus.

FIG. 1 is a block diagram showing a hardware configuration of the image processing apparatus according to the first embodiment. However, at least one of the blocks shown in FIG. 1 may be implemented by software.

In FIG. 1, reference numeral 21 is a decoder block, reference numeral 22 is an image processing block, reference numeral 23 is a panel property correction block, reference numeral 24 is a panel driver block, and reference numeral 25 is a panel block.

In the content of broadcast waves and disk media, luminance and chrominance signals are encoded (compressed). The luminance and chrominance signals are, in the case of a 2 k resolution (HD) video, in a format called "422 format" in which the chrominance signals in the right-left direction are only half of the luminance signal. In the case of a 4 k resolution (UHD) or a 8 k resolution (SHV) video, the luminance and chrominance signals are in a format called "420 format" in which not only the chrominance signals in the right-left direction, but also the chrominance signals in the up-down direction are only half of the luminance signal. Also, in the case of a tape-recorded digital video (DV), the luminance and chrominance signals are in a format called "411 format" in which the chrominance signals in the horizontal direction are only one quarter of the luminance signal. The present embodiment is applicable to all of these formats in which the chrominance signals are less than the luminance signal, but the following description will be given focusing on, as a representative example, an example in which the 420 format is used.

The compressed luminance and chrominance signals are first decoded (decompressed) into non-compressed luminance and chrominance signals by the decoder block 21. In the image processing block 22, the non-compressed luminance and chrominance signals are subjected to image processing such as color correction processing, tone correction processing, sharpness processing and scaling/transformation processing. The luminance and chrominance signals or the RGB signals output from the image processing block are corrected by the panel property correction block 23 according to the voltage luminance characteristics of the panel block 25. The panel driver block 24 performs display control by driving the panel block 25 serving as a display portion by using the corrected output. If a liquid crystal element is used, the panel block functions as a direct view panel with a backlight, and projection may be performed by using a light source. Also, the panel block may be a display apparatus that uses an organic EL panel. Alternatively, the panel block may be an image processing apparatus including the image processing block 22 of the present embodiment by configuring the panel property correction block 23, the panel driver block 24 and the panel block 25 into a separate display apparatus.

Image Processing Block

Figure 2:
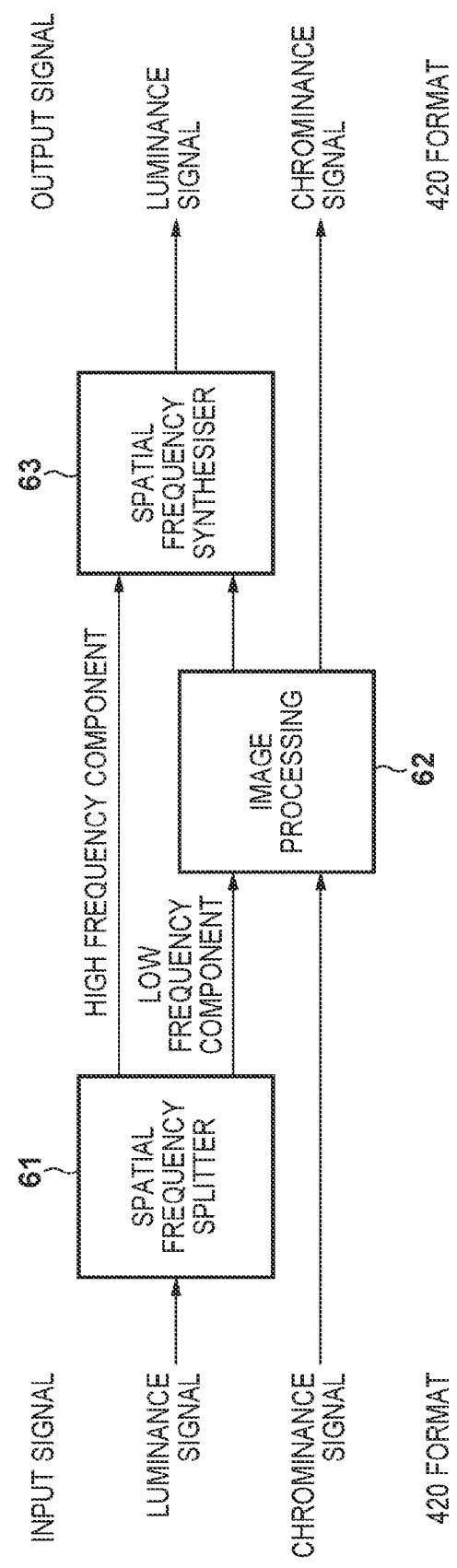
FIG. 2 is a block diagram showing an internal configuration of an image processing block.

An overview of an internal configuration of the image processing block 22 will be described next with reference to FIGS. 2 and 3. FIG. 2 is a block diagram showing the internal configuration of the image processing block 22 according to the first embodiment of the present invention.

In FIG. 2, reference numeral 61 is a spatial frequency splitter block that splits the luminance signal into components having different spatial frequencies, reference numeral 62 is an image processing block that performs image processing, and reference numeral 63 is a spatial frequency synthesiser block that combines the components having different spatial frequencies. As shown in FIG. 2, in the present embodiment, the luminance signal is split into a high frequency component and a low frequency component, image processing is performed only on the low frequency component and a chrominance signal, and the result is combined with the high frequency component.

Figure 3:
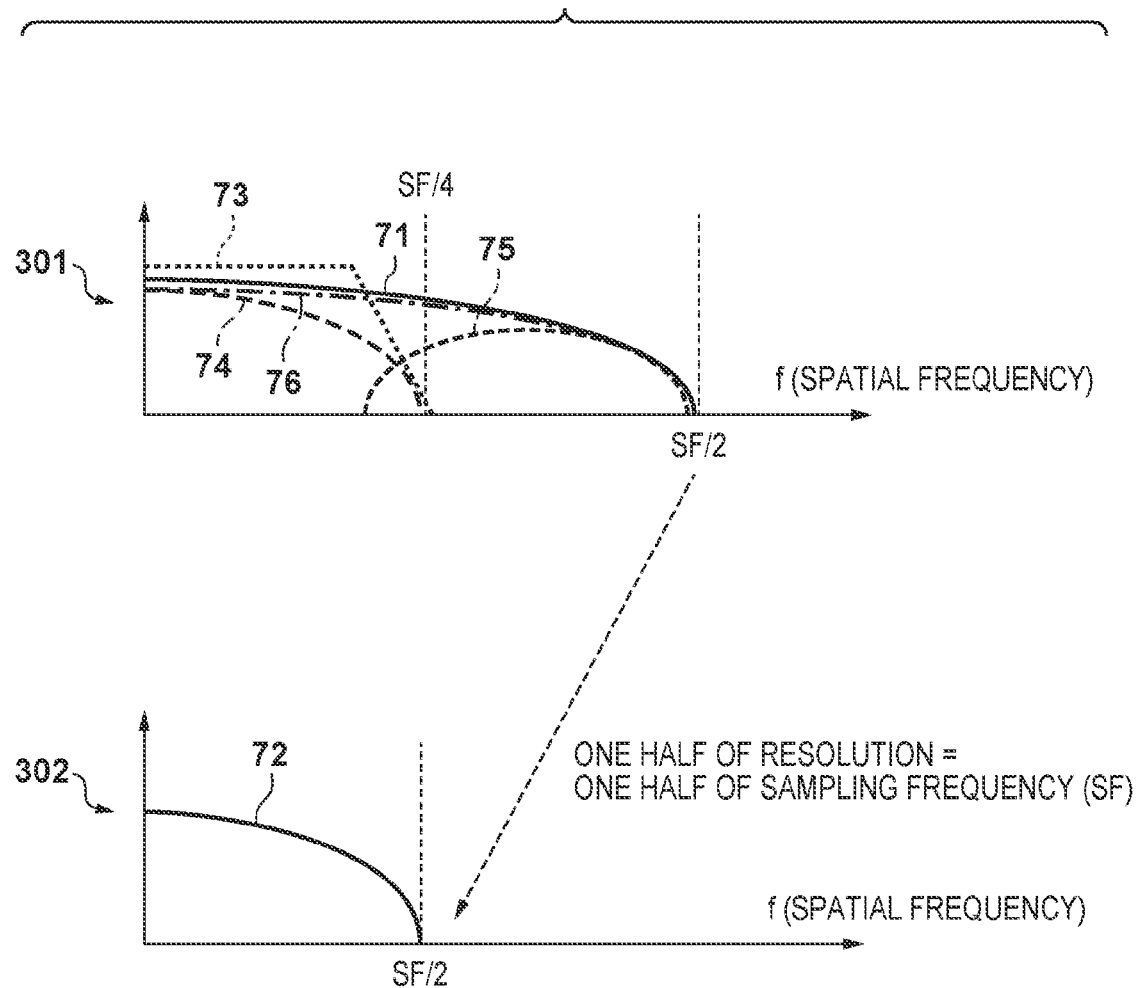
FIG. 3 is a diagram illustrating the frequency bandwidths of signals in the image processing block.

FIG. 3 is a diagram illustrating the frequency bandwidths of signals in the image processing block 22 according to the first embodiment. In FIG. 3, reference numeral 301 is an illustrative diagram showing the frequency bandwidth of the luminance signal, and reference numeral 302 shown in FIG. 3 is an illustrative diagram showing the frequency bandwidth of the chrominance signal.

In FIG. 3, reference numeral 71 is a frequency component of an input luminance signal, reference numeral 72 is a frequency component of an input chrominance signal, reference numeral 73 is frequency characteristics of a low pass filter, reference numeral 74 is a low frequency component of the luminance signal, reference numeral 75 is a high frequency component of the luminance signal, and reference numeral 76 is a frequency component obtained by combining the low frequency component and the high frequency component of the luminance signal.

An example will be described in which a luminance signal and a chrominance signal in the 420 format are input. In a 420 signal, the chrominance signal has a resolution only one half of that of the luminance signal in the vertical and horizontal directions. For this reason, the signals exist in an area within one half of the sampling frequency, which is the Nyquist frequency, and as shown in 301 and 302 in FIG. 3, the distribution of the sampling frequency (SF) is different between the luminance signal and the chrominance signal. To be specific, the frequency component 71 of the luminance signal extends to the high frequency region, whereas the frequency component 72 of the chrominance signal extends half thereof.

With different resolutions, it is difficult to perform processing that uses a 3D look-up table or the like by the image processing block 62, and therefore the spatial frequency splitter block 61 splits the luminance signal based on the spatial frequency. The splitter block 61 can be, for example, a low pass filter (LPF) having cutoff frequency characteristics 73 which are one quarter of the sampling frequency. A low frequency component 74 is obtained as a result of the frequency component 71 of the input luminance signal passing through the LPF. A high frequency component 75 is obtained by subtracting the low frequency component 74 from the frequency component 71 of the input luminance signal. The high frequency component 75 may be extracted by using a high pass filter.

By using the low frequency component 74 of the luminance signal and the frequency component 72 of the chrominance signal, image processing by the image processing block 62 can be performed. Although not shown, image processing for a high frequency region such as sharpness processing can be performed on the high frequency component 75.

The low frequency component of the luminance signal obtained as a result of image processing can be restored to a frequency component 76 of the luminance signal having a wide range of components from a low frequency to a high frequency by adding the high frequency component 75 by using the combining block 63.

As described above, in the first embodiment, image processing is performed by using the low frequency component of the luminance signal and the chrominance signal, and the resultant is combined with the high frequency component of the luminance signal, as a result of which high resolution information is not lost while performing desired image processing at a low resolution.

Figure 4:
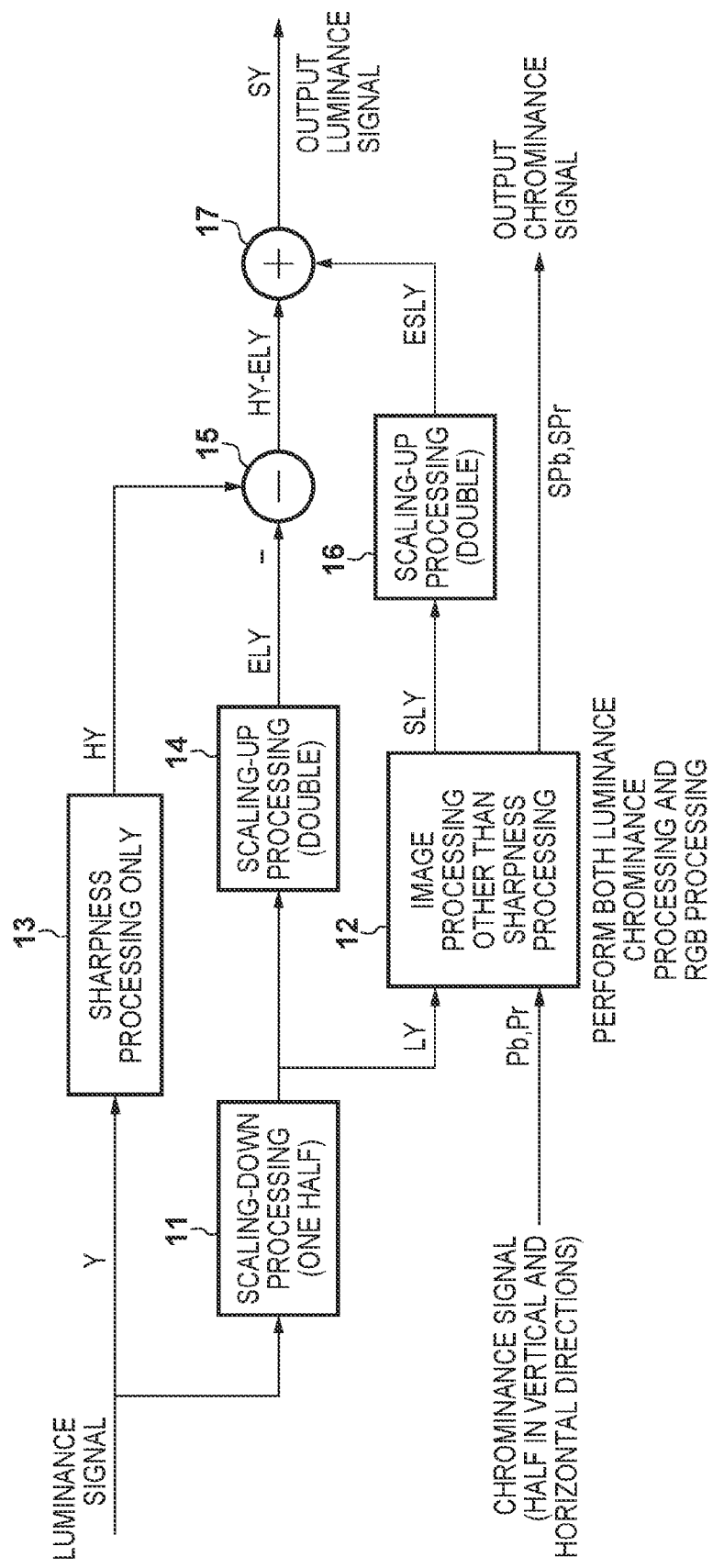
FIG. 4 is a block diagram showing a detailed configuration of the image processing block.

Next, the internal configuration of the image processing block 22 will be described in further detail with reference to FIG. 4. FIG. 4 is a block diagram showing a detailed configuration according to the first embodiment. In FIG. 4, reference numeral 11 is a scaling-down portion that scales down the resolution of the luminance signal, reference numeral 12 is an image processing portion that performs image processing other than sharpness processing, reference numeral 13 is a processing portion that performs sharpness processing, reference numeral 14 is a first resolution scaling-up portion, reference numeral 15 is a subtracter, reference numeral 16 is a second resolution scaling-up portion, and reference numeral 17 is an adder.

As in FIG. 2, an example will be described in which a luminance signal and a chrominance signal in the 420 format are input. A luminance signal Y is input into the sharpness processing portion 13, where sharpness processing is performed so as to give a luminance signal HY. The processing performed in the sharpness processing portion 13 is not limited to sharpness processing, and high frequency component processing is performed. At the same time, the luminance signal Y is input into the scaling-down portion 11, where the luminance signal Y is scaled down by one half in both the vertical and horizontal directions by using, for example, a low pass filter (LPF) optimized for scaling-down so as to give a scaled-down luminance signal LY. As described above, the scaling-down portion 11 obtains a low frequency component signal from an image component signal having a higher resolution than that of another image component signal of a plurality of image component signals having different resolutions included in the input image signal. Also, the sharpness processing portion 13 performs sharpness processing on an image component signal having a high resolution.

A chrominance signal Pb and Pr input separately from the luminance signal has a resolution one half of that of the luminance signal Y in the vertical and horizontal directions, and thus have the same resolution as that of the scaled-down luminance signal LY. The two signals are input into the image processing portion 12 that performs image processing other than sharpness processing, where image processing such as color correction processing and tone correction processing is performed so as to give an image-processed scaled-down luminance signal SLY and an output chrominance signal SPb and Spr, which are image-processed chrominance signals. Here, calculation processing and table calculation processing performed by the image processing portion 12 that performs image processing other than sharpness processing may be performed in a YPbPr format, or may be performed in an RGB format by converting the format to the RGB format, and the RGB format may be converted back to the YPbPr format after processing has been performed. As described above, the image processing portion 12 that performs image processing other than sharpness processing executes predetermined image processing on each of the low frequency component signal of the luminance signal and an image component signal (chrominance signal), which is the other image component signal included in the input image signal.

Next, the scaled-down luminance signal LY is scaled up by a factor of two in the vertical and horizontal directions by the first scaling-up portion 14 so as to give a luminance signal ELY that has undergone scaling-down processing and scaling-up processing. The scaling-up processing can be, usually, a simple scaling-up method, a linear interpolation method, a cubic interpolation method, a database-type super-resolution method or the like. In the present embodiment, the high frequency component is stored via a different route, and thus the following description will be given by using linear interpolation that does not create an excess high frequency component.

Also, the scaled-down luminance signal SLY that has undergone image processing is also scaled-up by a factor of two in the vertical and horizontal directions by the second scaling-up portion 16 so as to give a luminance signal ESLY that has undergone scaling-down processing, image processing and scaling-up processing. The scaling-up processing performed by the second scaling-up portion is the same as the processing of the first scaling-up portion, and with this configuration, it is possible to output an image having high image quality.

Next, the subtracter 15 subtracts the luminance signal ELY that has undergone scaling-down processing and scaling-up processing from the luminance signal HY that has undergone sharpness processing so as to give a high frequency component of the luminance signal. Next, the adder 17 adds the luminance signal ESLY having the low frequency component that has undergone scaling-down processing and scaling-up processing so as to give an output luminance signal SY having a full frequency region. In this way, a display signal is generated based on the processed signal obtained as a result of image processing performed on the low frequency component signal of the luminance signal, the high frequency component signal of the luminance signal, and the processed signal obtained as a result of image processing performed on the chrominance signal.

As described above, in the present embodiment, processing is performed so as to subtract a luminance signal that has simply undergone scaling-down processing and scaling-up processing from a luminance signal obtained as a result of an input luminance signal being subjected to high frequency component processing, and then add a luminance signal obtained as a result of low frequency component processing together with a chrominance signal. By doing so, it is possible to accurately add only a luminance signal obtained as a result of image processing other than sharpness processing.

The order of calculation may be changed as appropriate as long as the results do not change. For example, from the calculation commutative law, it is obvious that the same results are obtained even when the order of arrangement of the adder 17 and the subtracter 15 is reversed. It is also possible to change the order such that the signal is input into the sharpness processing portion 13 after it has passed through the scaling-down portion 11, the scaling-up portion 14 and the subtracter 15.

Relationship Between Image Processing and Color Shift

Next, the influence of image processing on color shifting that occurs when the luminance signal and the chrominance signal have different resolutions will be described with reference to FIG. 5. FIG. 5 is a diagram illustrating a relationship between color shifting and image processing.

In FIG. 5, reference numeral 501 is luminance and chrominance signals of an original image, and reference numeral 502 is luminance and chrominance signals in the 420 format during transmission. Reference numeral 503 is luminance and chrominance signals in which the chrominance signal has been scaled up, and reference numeral 504 is luminance and chrominance signals in which the luminance signal has been scaled down in the present embodiment.

In FIG. 5, reference numeral 31 is the luminance signal value of a left pixel, reference numeral 32 is the luminance signal value of a right pixel, reference numeral 33 is the chrominance signal value of the left pixel, reference numeral 34 is the chrominance signal value of the right pixel, reference numeral 35 is the chrominance signal value of the 420 signal, reference numeral 36 is the scaled-up chrominance signal value, and reference numeral 37 indicates the scaled-down luminance signal value. Here, the chrominance signal is composed of two values, namely, Pb value and Pr value, and because descriptions of the two chrominance values will be the same, reference numerals are given to only one of them.

The relationship between luminance and chrominance in the original image is so-called 444 format in which the luminance signal and the chrominance signal have the same resolution. As shown in 501 of FIG. 5, each of the left pixel and the right pixel has both a luminance signal value and a chrominance signal value.

In order to save the transmission bandwidth, 502 is obtained by changing the format of 501 to a 422 signal format or a 420 signal format. By using a method which will be described later, the chrominance signal value 33 of the left pixel and the chrominance signal value 34 of the right pixel are averaged so as to give a chrominance signal value 35 in the 420 signal format.

From 502, it is necessary to adjust the resolution to match in order to perform image processing. Reference numeral 503 shows an example in which the chrominance signal is scaled up to obtain a scaled-up chrominance signal value 36. In 503, an example of scaling-up processing using a simple scaling-up method is shown. In this state, the scaled-up chrominance signal value 36 is larger than the chrominance signal value 33 of the left pixel in the original image, and thus the left pixel undergoes color shifting to magenta. Conversely, the scaled-up chrominance signal value 36 is smaller than the chrominance signal value 34 of the right pixel in the original image, and thus the right pixel undergoes color shifting to green. If image processing such as color correction processing is performed on each of the pixels that have undergone such color shifting, the content of image processing is different between the right pixel and the left pixel due to the color shifting. Then, image processing cannot be performed correctly as originally intended, and thus disturbances such as a severe color shift and a pseudo contour occur.

In the present embodiment, in order to adjust the resolution to match, the luminance signal shown in 502 is scaled down so as to give a scaled-down luminance signal value 37 as shown in 504. As will be described later, the scaling-down processing is performed by performing the same processing as the processing of making the chrominance signal in the 420 format, and thereby an average value of the right luminance pixel 31 and the left luminance pixel 32 is obtained.

In the present embodiment, both the scaled-down luminance signal value 37 and the chrominance signal value 35 in the 420 format are averaged pixel values, and thus no color shifting occurs. Because image processing can be performed in a state in which there is no color shift, disturbances that occur when the chrominance signal is scaled up do not occur.

Scaling-Down Processing

The chrominance scaling-down processing in the original 420 format and the scaling-down processing portion according to the present embodiment will be described next with reference to FIGS. 6 and 7. FIG. 6 is an illustrative diagram showing the position of the center of gravity of the luminance signal and the chrominance signal in the 420 format. In FIG. 6, reference numeral 601 indicates the case where the center of gravity is in an upper left position, reference numeral 602 indicates the case where the center of gravity is at a center position, and reference numeral 603 indicates the case where the center of gravity is in a left position. In 601, reference numeral 141 indicates four luminance pixels including two vertically arranged pixels and two horizontally arranged pixels that are indicated by rectangles, and reference numeral 142 indicates the position of the center of gravity of a chrominance pixel.

There are roughly three transmission signals having different positions of the center of gravity depending on which LPF was used to perform sampling when a 420 format transmission signal was created from the original image.

Reference numeral 601 shows the case where the position 142 of the center of gravity of the chrominance signal matches the position of the upper left pixel of the four luminance pixels 141. In this case, an LPF having a size of odd number×odd number is used to determine a chrominance value serving as a representative value.

Reference numeral 602 shows the case where the position 142 of the center of gravity of the chrominance signal is at the very center of the four luminance pixels 141. In this case, an LPF having a size of even number×even number is used to determine a chrominance value serving as a representative value.

Reference numeral 603 shows the case where the position 142 of the center of gravity of the chrominance signal is at the center position of the two left pixels of the four luminance pixels 141. In this case, an LPF having a size of odd number (horizontal direction)×even number (vertical direction) is used to determine a chrominance value serving as a representative value.

Next is a description of LPFs that are used in the scaling-down processing of scaling down the chrominance signal at the time of creating signals and the scaling-down processing of scaling down the luminance signal in the present embodiment. FIG. 7 shows examples of low pass filters (LPFs) that are used to scale down the chrominance signal in the 420 format and in the half scaling-down unit in the present embodiment.

In the scaling-down processing of scaling down the chrominance signal that is necessary to perform 420 conversion and the scaling-down processing of scaling down the luminance signal in the present embodiment, four pixels, with two pixels in the vertical direction and two pixels in the horizontal direction, may be simply averaged, but a sampling disturbance called moiré may occur. Accordingly, in order to scale down the cutoff frequency to one half of the original frequency, scaling-down processing is performed by using an LPF with a slightly larger region such as about 3×3 pixels to 6×6 pixels, and the occurrence of moiré can thereby be suppressed. In the present embodiment, the luminance signal is scaled down by one half by using an LPF having similar characteristics to that used in 420 conversion of the chrominance signal.

In FIG. 7, reference numeral 701 is an average filter having a region of 3×3 pixels, reference numeral 702 is an average filter having a region of 4×4 pixels, reference numeral 703 is a Gaussian filter having a region of 4×4 pixels, and reference numeral 704 is a Gaussian filter having a region of 5×5 pixels. Reference numeral 705 is an average filter having a region of 3×2 pixels, reference numeral 706 is a Gaussian filter having a region of 3×2 pixels, and reference numeral 707 is a Gaussian filter having a region of 5×4 pixels.

The pixel at the center of the blocks is used as the target pixel, and the number in each block is the scaling factor of the target pixel and the surrounding pixels. An output is obtained by dividing a total value multiplied by a scaling factor by a total value of scaling factors. Alternatively, instead of division, calculation may be performed by approximately performing multiplication and shift calculation.

The average filter 701 having a region of 3×3 pixels shown in FIG. 7 is obtained by, with the pixel in the upper left of 2×2 pixels to be scaled down being set as the center pixel, averaging the values of 8 pixels surrounding the center pixel. Calculation is performed such that a total value of the values obtained by multiplying the scaling factor of each pixel is divided by 9 or multiplied by 7 and then divided by 64 (discarding six bits).

The average filter 702 having a region of 4×4 pixels is obtained by, with the center position (no pixel) of 2×2 pixels to be scaled down being set as the center, averaging the values of 16 pixels surrounding the center. Calculation is performed such that a total value of the values obtained by multiplying the scaling factor of each pixel is divided by 16.

The Gaussian filter 703 having a region of 4×4 pixels is obtained by, with the center position (no pixel) of 2×2 pixels to be scaled down being set as the center, weighting more on the pixels closer to the center to calculate 16 pixels. Calculation is performed such that a total value of the values obtained by multiplying the scaling factor of each pixel is divided by 32.

The Gaussian filter 704 having a region of 5×5 pixels is obtained by, with the pixel in the upper left of 2×2 pixels to be scaled down being set as the center pixel, weighting more on the pixels closer to the center to calculate 25 pixels. Calculation is performed such that a total value of the values obtained by multiplying the scaling factor of each pixel is divided by 32.

The average filter 705 having a region of 3×2 pixels is obtained by, with the center position of two left pixels of 2×2 pixels to be scaled down being set as the center, averaging the values of 6 pixels surrounding the center. Calculation is performed such that a total value of the values obtained by multiplying the scaling factor of each pixel is divided by 6.

The Gaussian filter 706 having a region of 3×2 pixels is obtained by, with the center position of two left pixels of 2×2 pixels to be scaled down being set as the center, weighting more on the pixels closer to the center to calculate 6 pixels. Calculation is performed such that a total value of the values obtained by multiplying the scaling factor of each pixel is divided by 8.

The Gaussian filter 707 having a region of 5×4 pixels is obtained by, with the center position of two left pixels of 2×2 pixels to be scaled down being set as the center, weighting more on the pixels closer to the center to calculate 20 pixels. Calculation is performed such that a total value of the values obtained by multiplying the scaling factor of each pixel is divided by 32.

The LPFs having a larger size have a higher LPF strength (lower cutoff frequency) irrespective of whether the size is odd or even. In the case where the size is the same, the average filters have a higher LPF strength (lower cutoff frequency) than the Gaussian filters. Examples of filter sizes larger than or equal to 6×6 pixels are omitted here.

Here, the position of the center of gravity of the pixel varies between when a region having an even number of pixels is used as the LPF region and when a region having an odd number of pixels is used as the LPF region. Accordingly, it is determined whether the LPF used for the chrominance signal in the original transmission signal has an even number of pixels or an odd number of pixels with respect to each of the vertical direction and the horizontal direction, based on a shift of the position of the center of gravity in the signal. If it is determined that the LPF has an even number of pixels, a LPF having an even number of pixels is used for scaling-down processing of scaling down the luminance signal in the present embodiment. If it is determined that the LPF has an odd number of pixels, a LPF having an odd number of pixels is used. By doing so, the shift in the position of the center of gravity of the pixel can be reduced. The determination is made independently with respect to each of the vertical direction and the horizontal direction, and the even number or the odd number is matched for each direction.

An example has been described thus far in which the input signal is in the 420 format, but in the case where the input signal is in the 422 format, a one-dimensional LPF only in a horizontal direction may be used. In the case where the input signal is in the 411 format, an LPF having a size of about 6 to 10 pixels in the horizontal direction may be used.

The configuration and operations according to the first embodiment of the present invention have been described thus far, but the present invention is not limited to the embodiment described above, and can be configured in other embodiments having the same spirit of the invention. With the embodiment as described above, most of the image processing can be performed on a 420 video having a high resolution by using a circuit having only one quarter bandwidth. Accordingly, it is unnecessary to use a parallel circuit, and it is therefore possible to prevent an increase in the circuit size. Also, the operating frequency of the circuit can be decreased, and power consumption can be reduced. Also, image processing is performed in a state in which the resolution in the horizontal direction is decreased by one half, and it is therefore possible to eliminate the line memory for filter processing and the like. Also, image processing is performed in a state in which there is no color shift, and thus degradation can be minimized without increasing a color shift. Also, by separately performing resolution processing alone, it is possible to obtain an excellent image output in which high resolution information is not lost.

Under the current situation, as the format used in broadcasting and media is upgraded from HD to UHD or SHV, the resolution and the number of pixels are increased by about a factor of four, and thus the operating bandwidth required for image processing is also increased. With the image processing apparatus according to the present embodiment, image processing can be performed on a 420 video having a high resolution, with less degradation in image quality, by performing most of the image processing by using a circuit having one quarter bandwidth. Accordingly, the operating bandwidth required for the image processing circuit can be significantly reduced. Likewise, in image processing performed by using a microprocessor as well, the amount of processing in most of the image processing is reduced to one quarter, and thus the image processing can be performed at a high speed.

The above effects can be obtained not only in the 420 signal, but also in an input signal in which the luminance signal and the chrominance signal have different resolutions such as a 422 signal or a 411 signal. Also, with a 444 signal, similar effects can be obtained by converting the 444 signal to a 420 signal and performing similar image processing with less degradation. Also, by configuring the scaling-up characteristics of the scaling-up portion 14 to be an inverse of the scaling-down characteristics of the scaling-down portion 11, the high frequency component and the low frequency component of the luminance signal can be matched and combined.

Second Embodiment

Figure 8:
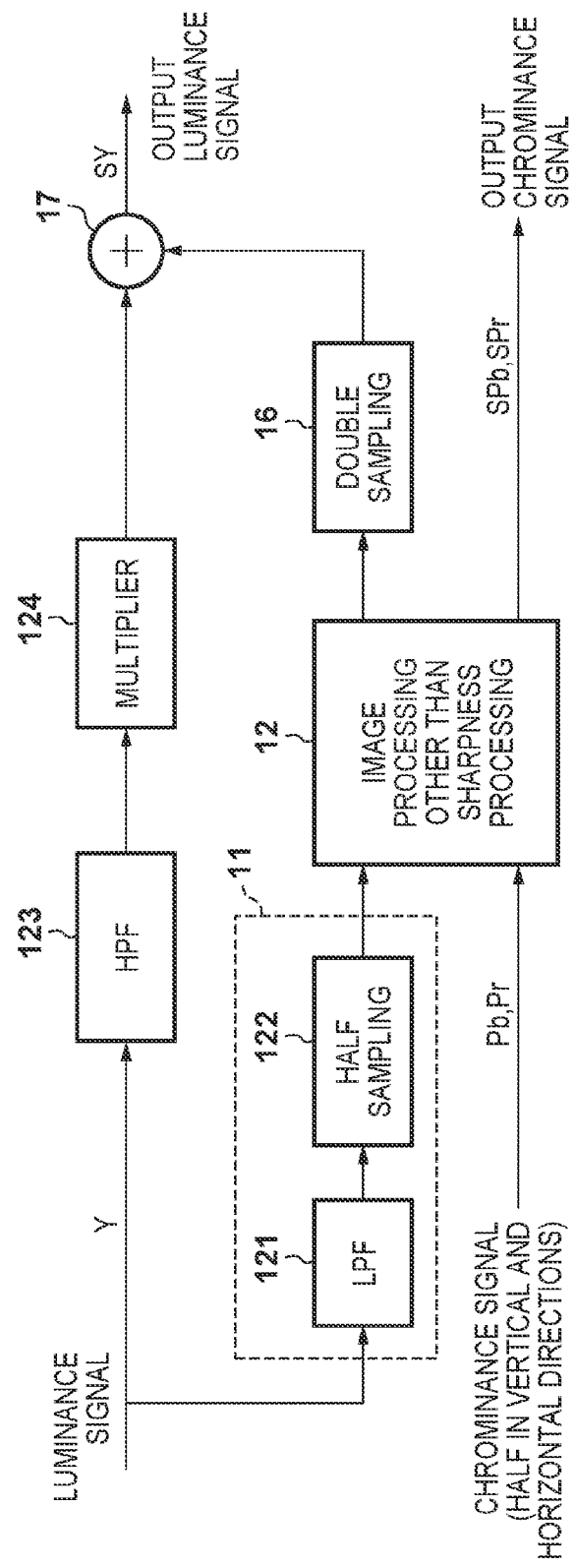
FIG. 8 is a block diagram showing a detailed configuration of an image processing block.

A second embodiment in which a simplified HPF and sharpness circuit is provided in the above-described embodiment will be described next with reference to FIG. 8. FIG. 8 is a block diagram showing a detailed configuration of an image processing block 22 according to the second embodiment of the present invention.

In FIG. 8, reference numerals 11, 12, 16 and 17 indicate the same constituent elements as those shown in FIG. 4. Reference numeral 121 is an LPF processing portion that is a constituent element of the half scaling-down portion 11, reference numeral 122 is a half sampling portion that is a constituent element of the half scaling-down portion 11, reference numeral 123 is a HPF processing portion, and reference numeral 124 is a multiplier.

In the diagram, for the sake of ease of understanding of the description, the half scaling-down portion 11 is shown to include the LPF portion 121 and the half sampling portion 122, and the half scaling-up processing portion 16 is named as double sampling portion 16. In the present embodiment, the half scaling-down portion 11, the double scaling-up portion 14 and the subtracter 15 shown in FIG. 4 are brought together into the HPF processing portion 123. The characteristics of the HPF processing portion 123 are obtained by the following equation and thus can be brought together.

HPF characteristics=1−(double sampling characteristics×(half sampling characteristics×LPF characteristics))

Then, by the multiplier 124 multiplying the luminance signal Y having only a high frequency component by the HPF processing portion 123 by an appropriate constant, sharpness processing and softness processing can be performed. To be specific, as a result of the multiplier 124 multiplying by a value greater than 1.0, the proportion of the high frequency component that is added by the adder 17 increases, and thus an output luminance signal SY that has undergone sharpness processing can be obtained. Conversely, as a result of the multiplier 124 multiplying by a value less than 1.0, the proportion of the high frequency component that is added by the adder 17 decreases, and thus an output luminance signal SY that has undergone softness processing can be obtained.

As described above, in the present embodiment, the same effects as those of the first embodiment described above can be obtained with a simplified circuit.

Third Embodiment

In the first and second embodiments, examples have been described in which the present invention is applied to the 420 format that is used in broadcasting and media distribution in the 4 k signal and the 8 k signal. Here, a third embodiment will be described in which the present invention is applied to the dual green (DG) format that is used in camera shooting, editing or previewing that uses the 8 k signal. As used herein, the 8 k DG format refers to a format that pseudoly represents a 8 k worth of image by using four color images including 4 k worth of an R image, 4 k worth of a B image, 4 k worth of a G1 image that is located in in the upper right by an amount corresponding to one pixel in 8 k, and 4 k worth of a G2 image that is located in the lower left by an amount corresponding to one pixel in 8 k.

Figure 9:
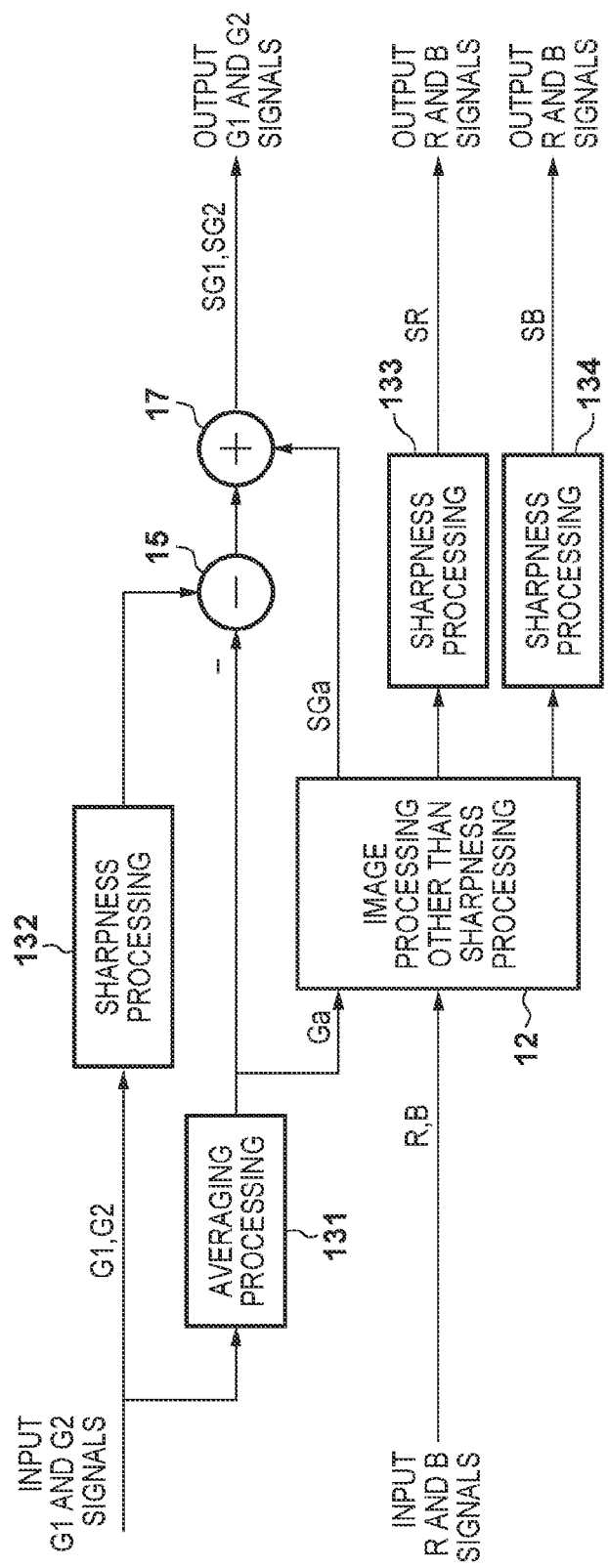
FIG. 9 is a block diagram showing a detailed configuration of an image processing block.

FIG. 9 is a block diagram showing a detailed configuration of an image processing block 22 according to the third embodiment of the present invention. In FIG. 9, reference numerals 12, 15 and 17 indicate the same constituent elements as those shown in FIG. 4. Reference numeral 131 is an averaging processing portion, reference numeral 132 is a green sharpness processing portion, reference numeral 133 is a red sharpness processing portion, and reference numeral 134 is a blue sharpness processing portion.

In the present embodiment, an RG1G2B image in the 8 k DG format is processed. All of the R image, the G1 image, the G2 image and the B image have an equal size of 4 k, and thus the scaling-down processing and scaling-up processing described in the above embodiments are unnecessary. Instead, in the averaging processing 131, an average Ga signal is extracted, the average Ga signal being a low frequency signal of a signal obtained by combining a G1 signal and a G2 signal. Image processing other than sharpness processing is performed by using the Ga signal and the original R and B signals in the image processing portion 12. Here, the RGB images have a matching resolution, and thus it is possible to perform processing in which the RGB signals interact with each other such as 3D LUT.

Next, in the embodiments described above, sharpness processing is performed on the luminance signal Y, but in the present embodiment, sharpness processing is also performed on the RGB signals. In the green sharpness processing portion 132, the G1 signal and the G2 signal are subjected to a sharpness processing filter while considering the positional relationship therebetween. Only the green sharpness processing portion 132 requires pseudo 8 k processing. In the subtracter 15, Ga is subtracted from each of the G1 and G2 signals that have undergone sharpness processing, and a SGa signal that has undergone processing other than sharpness processing is added so as to give an output SG1 and an output SG2. The processed red and blue signals are respectively subjected to ordinary sharpness processing by the sharpness processing portions 133 and 134 so as to give outputs.

As described above, with respect to the 8 k DG format as well, image processing can be performed by using only an image processing circuit having a processing speed for 4 k and a special green sharpness processing circuit, without using an image processing circuit having a processing speed for 8 k. In the case where sharpness processing is unnecessary such as signal processing or the like of a camera, the configuration can be further simplified.

Next is a description of the case where geometric transformation processing such as scaling/transformation processing is performed on the input image. The geometric transformation processing is performed in both the sharpness processing portion and the image processing portion that performs image processing other than sharpness processing. Alternatively, geometric transformation processing may be performed on the output luminance and chrominance signals. It is also possible to convert the output luminance and chrominance signals in the RGB format and then perform geometric transformation processing.

Fourth Embodiment

Figure 10:
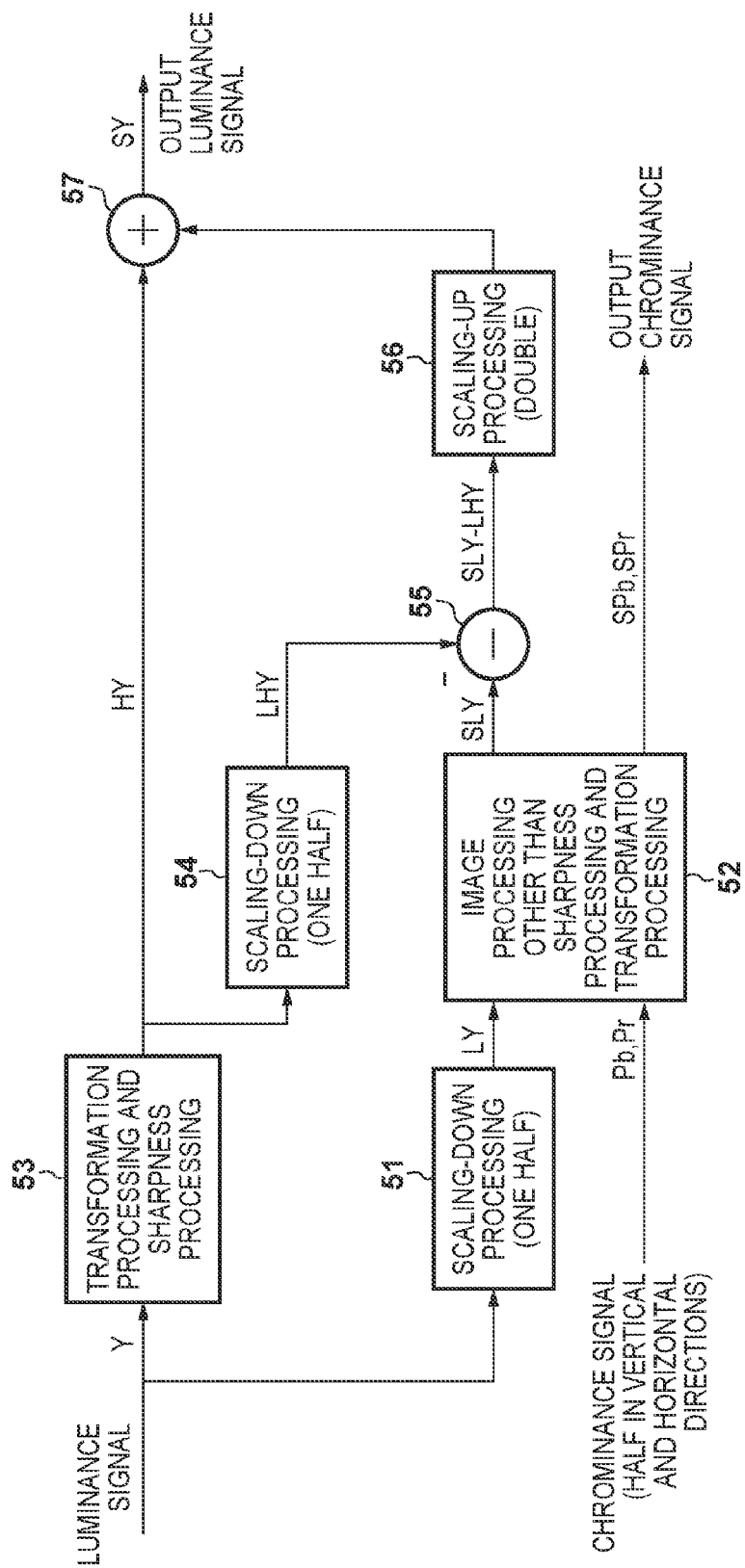
FIG. 10 is a block diagram showing a detailed configuration of an image processing block.

The embodiments described above do not describe geometric transformation processing, but subtraction processing may be performed using the scaled-down luminance signal while performing geometric transformation processing. This will be described as a fourth embodiment with reference to FIG. 10. FIG. 10 is a block diagram showing a detailed configuration of an image processing block 22 according to the fourth embodiment of the present invention. In FIG. 10, reference numeral 51 is a first resolution scaling-down portion, reference numeral 52 is an image processing portion that performs image processing other than sharpness processing, and geometric transformation processing, reference numeral 53 is a processing portion that performs sharpness processing and geometric transformation processing, reference numeral 54 is a second resolution scaling-down portion, reference numeral 55 is a subtracter, reference numeral 56 is a resolution scaling-up portion, and reference numeral 57 is an adder.

An example will be described in which a luminance signal and a chrominance signal in the 420 format are input. First, a luminance signal Y is input into the processing portion 53 that performs sharpness processing and geometric transformation processing, where sharpness processing and geometric transformation processing are performed so as to give a luminance signal HY.

At the same time, the luminance signal Y is input into the first resolution scaling-down portion 51, where it is scaled down by one half in the vertical and horizontal directions so as to give a scaled-down luminance signal LY. In the case of the 420 format, a chrominance signal Pb and Pr has the same resolution as that of the luminance signal LY that has been scaled down by one half. These signals are input into the processing portion 52 that performs image processing other than sharpness processing and geometric transformation processing, where image processing other than sharpness processing such as color correction processing and tone correction processing, and geometric transformation processing are performed. As a result of the image processing, an image-processed scaled-down luminance signal SLY and an image-processed output chrominance signal SPb and Spr are obtained. Here, calculation processing, table calculation processing and geometric transformation processing in the processing portion 52 that performs image processing other than sharpness processing and geometric transformation processing may be performed in a YPbPr format, or may be performed in an RGB format by converting the format to the RGB format, and the RGB format may be converted back to the YPbPr format after processing has been performed.

Next, from the luminance signal HY that has undergone sharpness and geometric transformation processing, a luminance signal LHY that has been scaled down after the sharpness and geometric transformation processing is produced by the second resolution scaling-down portion 54. The subtracter 55 subtracts the luminance signal LHY that has been scaled down after the sharpness and geometric transformation processing from the image-processed scaled-down luminance signal SLY so as to give a difference SLY-LHY of the low frequency component of the luminance signal. The difference SLY-LHY of the low frequency component of the luminance signal is scaled up by a factor of 2×2 by the resolution scaling-up portion 56, which is then added to the luminance signal HY that has undergone sharpness processing and geometric transformation processing by the adder 57 so as to give an output luminance signal SY.

In the present embodiment, an example has been shown in which even when the number of scaling-down portions and the number of scaling-up portions are changed from those of the first embodiment, it is possible to perform necessary processing by using the configuration of the present embodiment. The present embodiment also shows that it is also possible to adapt to geometric transformation processing.

Fifth Embodiment

Up to here, the embodiments of the present invention have been described by taking an example in which in the luminance and chrominance signals, the chrominance signal is less than the luminance signal, assuming that the present invention is applied to household appliances that reproduce broadcast waves and distributed media. On the other hand, in business applications such as image capturing equipment and editing equipment that are used to create content, formats are used such as a format called 444 format in which luminance and chrominance signals are included in equal numbers, and a format that uses an RGB color space. Accordingly, as an example of an embodiment in which image processing is carried out in image capturing equipment and editing equipment, a configuration that performs image processing on a signal in the 444 format will be described as the fifth embodiment with reference to FIGS. 11 and 12.

Figure 11:
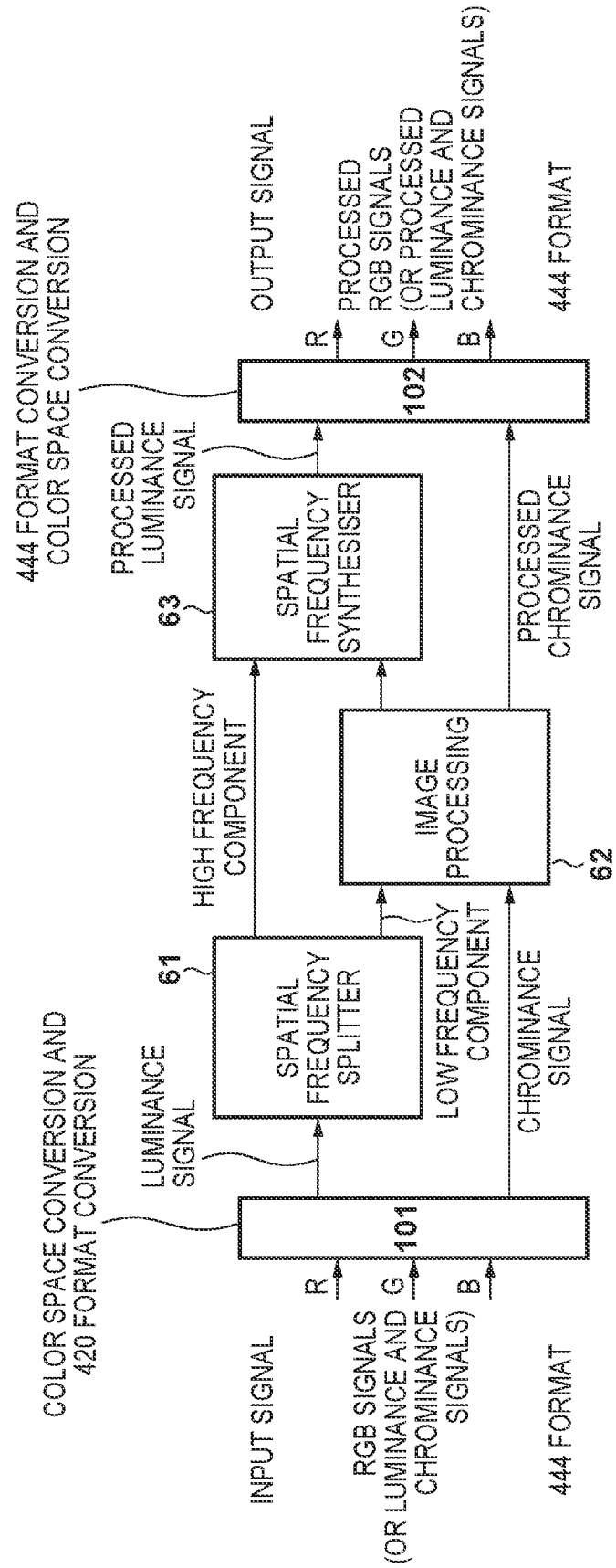
FIG. 11 is a block diagram showing a configuration of an image processing block.

FIG. 11 is a block diagram showing a configuration of an image processing block according to the fifth embodiment of the present invention. In FIG. 11, reference numerals 61 to 63 indicate the same blocks as those shown in FIG. 2, reference numeral 101 is a block that performs conversion to a luminance chrominance color space and conversion to a 420 format, and reference numeral 102 is a block that performs conversion to a 444 format and conversion to an RGB color space.

Figure 12:
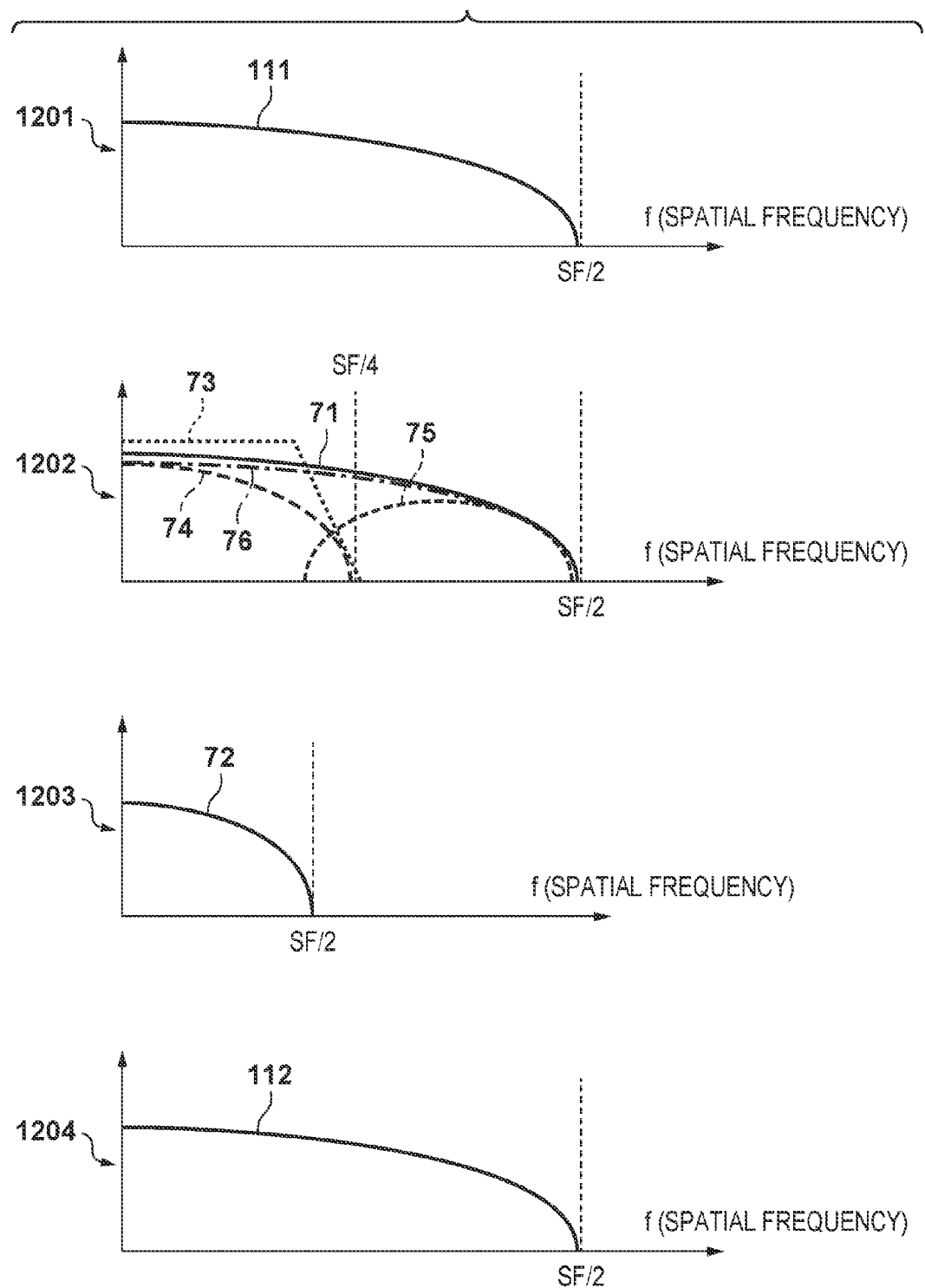
FIG. 12 is a diagram illustrating the bandwidths of signals in the image processing block.

FIG. 12 is a diagram illustrating the bandwidths of signals in the image processing block according to the fifth embodiment. In FIG. 12, reference numeral 1201 is an illustrative diagram of the frequency bandwidth of input RGB signals, and reference numeral 1202 is an illustrative diagram of the frequency bandwidth of a luminance signal. Reference numeral 1203 is an illustrative diagram of the frequency bandwidth of a chrominance signal, and reference numeral 1204 is an illustrative diagram of the frequency bandwidth of output RGB signals. In FIG. 12, reference numerals 71 to 75 indicate the same frequency components as those shown in FIG. 3, reference numeral 111 is a frequency component of the input RGB signals, and reference numeral 112 is a frequency component of the output RGB signals.

An example will be described in which RGB signals in the 444 format are input as input signals. In the case where luminance and chrominance signals in the 444 format are input, color space conversion processing in the former half of the following processing is omitted. As shown in 1201, the RGB signals in the 444 format have a frequency component less than one half of the sampling frequency, which is a Nyquist frequency, the frequency component being the frequency component 111 of the input RGB signals. The RGB signals are converted to a luminance chrominance color space by the block 101 that performs color space conversion and 420 conversion, and at the same time, the chrominance signal is scaled down by one half in the vertical and horizontal directions by using an LPF. As a result, luminance and chrominance signals in the 420 format are obtained. The frequency component of the luminance signal is indicated by 71, and the frequency component of the chrominance signal is indicated by 72. Image processing performed on the luminance and chrominance signals in the 420 format is the same as that shown in FIG. 2, and thus a description thereof is omitted, but the frequency component of the luminance signal obtained after image processing is indicated by 76, which is obtained by adding 74 and 75, and the frequency component of the chrominance signal remains the same as 72.

The luminance and chrominance signals in the 420 format are input into the block 102 that performs 444 conversion and color space conversion, where the chrominance signal is scaled up by a factor of two in the vertical and horizontal directions and converted to an RGB color space. Even when the chrominance signal is scaled up by a factor of two in the vertical and horizontal directions, the spatial frequency remains the same as 72 without increasing. When color space conversion is performed by using the luminance signal having a high spatial frequency and the chrominance signal having a low spatial frequency, the high frequency component 76 of the luminance signal is included in the frequency component of the RGB signals, and thus the frequency component 112 of the RGB signals is almost the same as the frequency component 76 of the luminance signal. In particular, the G signal has a higher proportion of the luminance signal, and thus there is less degradation in the frequency. When viewed on a display apparatus, the resolution of a monochrome portion has a high proportion of G pixels, and thus a high sense of resolution can be obtained, which is preferable.

Accordingly, in the present embodiment as well, image processing is performed by using a narrow bandwidth, but the high frequency component of the RGB signals in the 444 format is maintained, and thus image degradation is suppressed. In the case where it is necessary to use the luminance and chrominance signals in the 420 format as the output of capturing equipment or edited content, the block 102 that performs 444 conversion and color space conversion in the latter half of the processing is unnecessary.

By using the present embodiment, with the RGB signals or the luminance and chrominance signals in the 444 format image as well, most of the image processing can be performed by using a circuit having only one quarter bandwidth, and thus the operating frequency is reduced and low power consumption can be achieved. Also, the need for configuring a parallel circuit is eliminated, and it is therefore possible to prevent an increase in the circuit size. Also, the line memory can be eliminated. Also, by separately performing resolution processing alone, it is possible to obtain an excellent image output in which high resolution information is not lost.

Sixth Embodiment

As a sixth embodiment, a configuration according to a variation of the present invention that uses a microprocessor or the like will be described next with reference to FIGS. 13 and 14.

Figure 13:
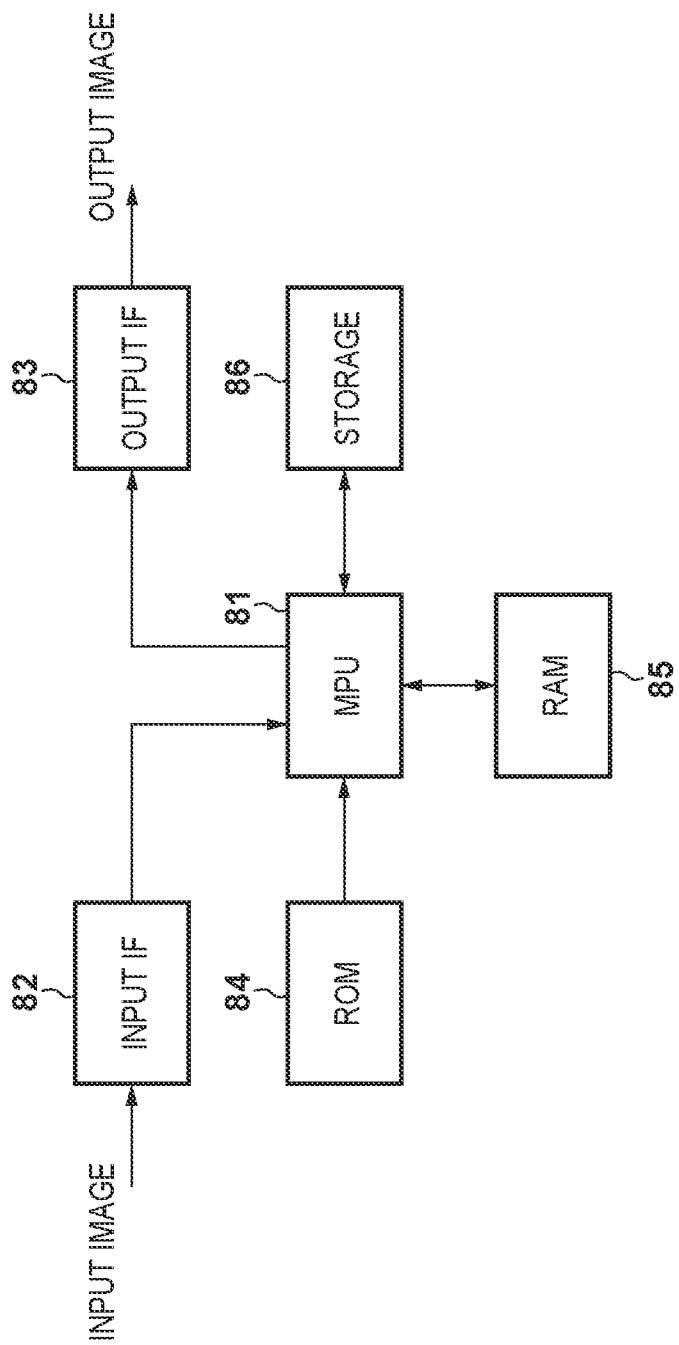
FIG. 13 is a block diagram showing a configuration example in which a microprocessor is used.

FIG. 13 is a block diagram showing a configuration that uses a microprocessor according to the sixth embodiment. In FIG. 13, reference numeral 81 is a microprocessor (MPU) that performs calculation and control, reference numeral 82 is an input interface, and reference numeral 83 is an output interface. Reference numeral 84 is a ROM in which a computer program is stored, reference numeral 85 is a RAM that is used as a working memory, and reference numeral 86 is a storage that temporarily stores images. If the RAM 85 is large enough to store a plurality of images, the storage 86 may be omitted.

FIG. 14 is a flowchart illustrating processing performed by the microprocessor according to the sixth embodiment. The processing in the flowchart shown in FIG. 14 written in the ROM 84 is performed by the constituent elements shown in FIG. 13. Each step is executed based on the computer program by the MPU 81 while controlling the entire apparatus. Hereinafter, each step of the processing will be described.

First, in S901, an input image is read into the RAM 85 via the input image interface 81. In S902, the input image read into the RAM 85 is split into a luminance image and a chrominance image, which are then temporarily stored in the storage 86. In 5903, the luminance image is scaled down by using a LPF, which is then placed in the RAM 85 as a scaled-down image and stored in the storage 86. The scaling-down processing that uses a LPF is the same as that described in the first embodiment.

In S904, image processing such as color correction processing and tone correction processing is performed on the scaled-down luminance image placed in the RAM 85 and the chrominance image temporarily stored in S902, and then in S905, the image-processed luminance and chrominance images are temporarily stored in the storage 86. In S906, the image-processed luminance image is read out from the storage 86 so as to perform scaling-up processing, and the scaled-up luminance image is temporarily stored in the storage 86.

In S907, the original luminance image is read out from the storage 86 so as to perform high frequency component processing such as sharpness processing. Next, in S908, subtraction processing is performed to subtract the scaled-up luminance image temporarily stored in S906 from the luminance image that has undergone sharpness processing, and then in S909, the resultant is temporarily stored in the storage 86.

In S910, the image-processed luminance image stored in S905 is subjected to scaling-up processing. In S911, addition processing is performed to add the luminance image that has undergone subtraction processing and is temporarily stored in S909 to the scaled-up luminance image. The luminance image that has undergone addition processing is temporarily stored in S912. In S913, the luminance image temporarily stored in S912 and the chrominance image temporarily stored in S905 are output via the output interface 83 as an output image. The output image can be viewed as a result of display control that displays the output image on a display portion (not shown) such as a monitor.

The foregoing has described the steps when the same processing as that of the first embodiment is performed by a microprocessor. It is obvious that the processing according to any one of the fourth and fifth embodiments can also be performed by using a microprocessor, and thus a description thereof is omitted here.

According to the present embodiment, most of the image processing steps are performed on an image having one quarter resolution, and thus the processing time can be shortened by approximately a factor of four.

As described above, in each embodiment according to the present invention, with respect to an image signal composed of a plurality of image component signals having different resolutions, the high frequency component signal is split into a high frequency component and a low frequency component, and image processing is performed only on the low frequency component. For this reason, it is possible to reduce the processing load when image processing is performed on the image signal in which the luminance signal and the chrominance signal have different resolutions. Configuration examples for implementing the present invention have been described by way of a plurality of embodiments, but it is needless to say that the configuration for implementing the spirit of the present invention is not limited to the embodiments described above.

According to the present invention, it is possible to perform image processing on an input signal composed of a plurality of image component signals having different resolutions so as to not compromise resolution information, by using less bandwidth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-013832, filed Jan. 27, 2016, which is hereby incorporated by reference wherein in its entirety.

What is claimed is:

1. An image processing apparatus comprising:
an input unit configured to receive an input of an input image signal including a high resolution component signal and a low resolution component signal having a lower resolution than a resolution of the high resolution component signal;
a first obtaining unit configured to obtain a high frequency component signal of the high resolution component signal included in the input image signal;
a second obtaining unit configured to obtain a low resolution signal obtained by scaling down the resolution of the high resolution component signal included in the input image signal;
a changing unit configured to change a value of at least one of the low resolution signal and the low resolution component signal based on a combination of a value of the low resolution signal obtained by the second obtaining unit and a value of the low resolution component signal included in the input image signal input by the input unit; and
a generation unit configured to generate an output image signal corresponding to the input image signal based on the at least one of the low resolution signal and the low resolution component signal whose value has been changed by the changing unit, and the high frequency component signal obtained by the first obtaining unit.

2. The image processing apparatus according to claim 1, wherein the high resolution component signal is a luminance signal, and the low resolution component signal is a chrominance signal.

3. The image processing apparatus according to claim 1, wherein the input image signal includes, as the high resolution component signal and the low resolution component signal, a high resolution luminance signal and a low resolution chrominance signal obtained as a result of conversion processing on each of R, G and B image component signals, and
the generation unit is configured to generate the R, G and B image component signals as output image signals based on the at least one of the low resolution signal and the low resolution component signal whose value has been changed by the changing unit, and the high frequency component signal obtained by the first obtaining unit.

4. The image processing apparatus according to claim 1, wherein the low resolution signal obtained by the second obtaining unit and the low resolution component signal included in the input image signal input by the input unit have an equal resolution.

5. The image processing apparatus according to claim 1, wherein the second obtaining unit is configured to obtain the low resolution signal by executing low pass filter processing on the high resolution component signal.

6. The image processing apparatus according to claim 5, wherein the second obtaining unit is configured to, when a resolution difference between the high resolution component signal and the low resolution component signal is a first difference, execute the low pass filter processing on the high resolution component signal by applying a cutoff frequency that is lower than a cutoff frequency when the resolution difference is a second difference that is smaller than the first difference.

7. The image processing apparatus according to claim 1 further comprising:
an edge processing unit configured to execute edge enhancing processing on the high frequency component signal obtained by the first obtaining unit,
wherein the generation unit is configured to generate the output image signal by using the low resolution signal and the low resolution component signal that have been changed by the changing unit, and the high frequency component signal that has been processed by the edge processing unit.

8. The image processing apparatus according to claim 1 further comprising:
a high pass filter unit configured to execute high pass filter processing on the high frequency component signal obtained by the first obtaining unit,
wherein the first obtaining unit is configured to obtain the high frequency component signal based on the signal that has undergone the high pass filter processing and a predetermined multiplier factor.

9. The image processing apparatus according to claim 1, wherein the input unit is configured to input a dual green signal as the input image signal,
wherein the dual green signal includes, in addition to an R signal having a predetermined resolution and a B signal having the predetermined resolution, at least two G signals having the predetermined resolution,
wherein the first obtaining unit is configured to obtain a high frequency component signal of a combined G signal in which the at least two G signals are combined, and
wherein the second obtaining unit is configured to obtain a low resolution signal of the combined G signal in which the at least two G signals are combined.

10. The image processing apparatus according to claim 1, wherein the generation unit is configured to generate a first component signal of the output image signal by adding a first image signal and a second image signal, and
wherein the first image signal is obtained as a result of execution of predetermined image processing on the high frequency component signal, and the second image signal is obtained by subtracting the low resolution signal that has been changed by the changing unit from the low resolution signal.

11. The image processing apparatus according to claim 1 further comprising:
an increasing unit configured to execute increasing processing for increasing a resolution of the low resolution signal that has been changed by the changing unit,
wherein the generation unit is configured to generate the output image signal based on a high resolution signal obtained by the increasing unit increasing the resolution of the low resolution signal that has been changed by the changing unit, the low resolution component signal that has been changed by the changing unit, and the high resolution component signal obtained by the first obtaining unit.

12. The image processing apparatus according to claim 5, further comprising:
a determining unit configured to determine an amount of shift in position between the high resolution component signal and the low resolution component signal,
wherein the second obtaining unit is configured to determine whether to set the number of pixels that are subjected to the low pass filter processing to be an odd number of pixels or an even number of pixels, based on a result of the determination of the amount of shift by the determining unit.

13. An image processing method comprising:
receiving an input of an input image signal including a high resolution component signal and a low resolution component signal having a lower resolution than a resolution of the high resolution component signal;
obtaining a high frequency component signal of the high resolution component signal included in the input image signal;
obtaining a low resolution signal obtained by scaling down the resolution of the high resolution component signal included in the input image signal;
changing a value of at least one of the low resolution signal and the low resolution component signal based on a combination of a value of the low resolution signal and a value of the low resolution component signal included in the input image signal; and
generating an output image signal corresponding to the input image signal based on the high frequency component signal and the at least one of the low resolution signal and the low resolution component signal whose value has been changed.

14. A non-transitory computer-readable storage medium storing a program for causing a computer to execute a method comprising:
receiving an input of an input image signal including a high resolution component signal and a low resolution component signal having a lower resolution than a resolution of the high resolution component signal;
obtaining a high frequency component signal of the high resolution component signal included in the input image signal;
obtaining a low resolution signal obtained by scaling down the resolution of the high resolution component signal included in the input image signal;
changing a value of at least one of the low resolution signal and the low resolution component signal based on a combination of a value of the low resolution signal and a value of the low resolution component signal included in the input image signal; and
generating an output image signal corresponding to the input image signal based on the high frequency component signal and the at least one of the low resolution signal and the low resolution component signal whose value has been changed.

* * * * *